United States Patent [19]

Watson

[11] 4,068,725
[45] Jan. 17, 1978

[54] LUBRICATING SYSTEM FOR PLOW BLADES

[75] Inventor: William R. Watson, Burbank, Ill.

[73] Assignee: Nalco Chemical Company, Oak Brook, Ill.

[21] Appl. No.: 687,984

[22] Filed: May 19, 1976

[51] Int. Cl.² .......................................... A01B 17/00
[52] U.S. Cl. ...................................... 172/801; 172/1; 172/747; 172/755
[58] Field of Search ..................... 172/1, 747, 755, 801

[56] References Cited

U.S. PATENT DOCUMENTS

| 194,231 | 8/1877 | English et al. | 172/755 |
| 1,897,444 | 2/1933 | Stark | 172/755 |
| 3,418,157 | 12/1968 | Katzer | 172/747 X |
| 3,685,592 | 8/1972 | Frisbee | 172/755 X |

FOREIGN PATENT DOCUMENTS

| 195,571 | 4/1923 | United Kingdom | 172/755 |
| 234,770 | 10/1969 | U.S.S.R. | 172/755 |

*Primary Examiner*—Paul E. Shapiro
*Attorney, Agent, or Firm*—Hill, Gross, Simpson, Van Santen, Steadman, Chiara & Simpson

[57] ABSTRACT

A lubricating system for plow blades has a plurality of tube outlets positioned near a bottom portion of a plow blade and aligned to expel a dilute polymer lubricating fluid upward and onto a surface of the plow blade. As the plow blade scrapes up ground material, the scrapings distribute the lubricating fluid over the surface of the plow blade. Each of the tube outlets is supplied with lubricating fluid from a storage container via individual pumps.

5 Claims, 5 Drawing Figures

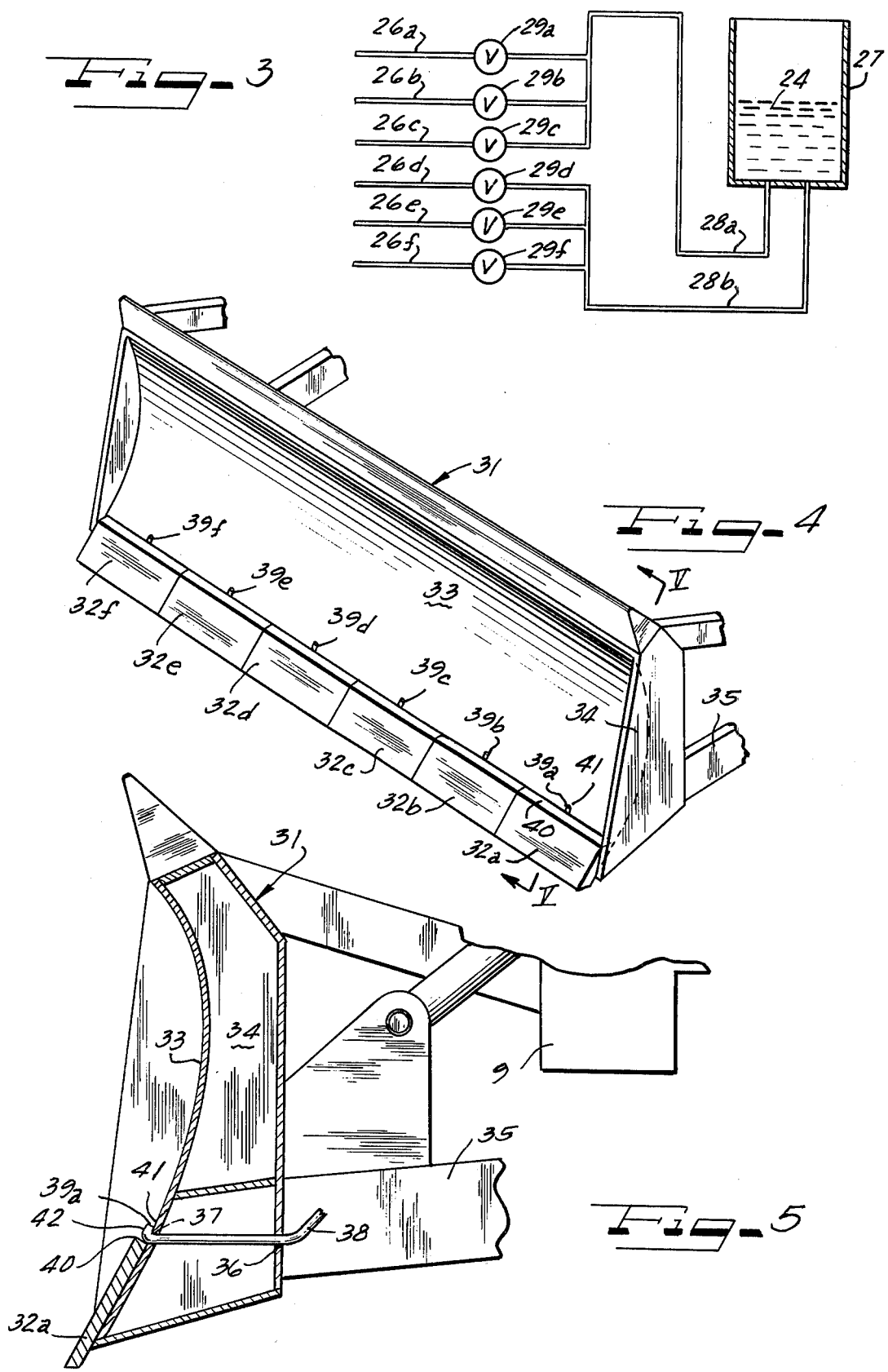

4,068,725

LUBRICATING SYSTEM FOR PLOW BLADES

BACKGROUND OF THE INVENTION

1. Field of the Invention:

This invention relates to a lubricating system and more particularly to a lubricating system for plow blades.

2. Description of the Prior Art:

In U.S. Pat. No. 3,418,157 to Katzer the use of dilute polymer lubricating agents is discussed for lubricating earth contacting surfaces such as earth working tools. By applying the dilute polymer lubricant to the surfaces, clayey earth does not stick to the surface as easily.

The use of bulldozer blades of large dimensions, such as a blade having a width of 40 feet or greater, has become increasingly popular for land reclamation projects since the cost of earth moving can be reduced with such large blades. It is desirable to improve the operating efficiency of such blades to further reduce cost.

SUMMARY OF THE INVENTION

It is an object of this invention to increase the efficiency of large plow blades by a substantially continuous application of lubricating fluid to a surface of the blade through an efficient fluid distribution system.

It is a further object of this invention to provide a lubricating system for a plow blade in which the ground material scraped up by the plow blade acts to distribute the lubricating fluid.

In accordance with the present invention, a plurality of tube outlets are located adjacent an upper edge of a cutting plate mounted at a bottom portion of a blade surface on a large plow blade. The tube outlets are aligned to expel lubricating fluid upward and parallel to adjacent portions of the blade surface. Feed tubes or lines connected to each of the tube outlets convey lubricating fluid from the storage container. A pump is connected to each of the feed lines to provide separate pressure drive for each outlet. As the cutting edge of the plow blade scrapes along the ground, the scraped up ground material compacts against portions of the blade which are wetted with the lubricating fluid. As the scraping continues, the scraped up material is distributed across the blade surface and carries with it the lubricating fluid for even distribution over the surface of the blade.

BRIEF DESCRIPTION OF THE DRAWINGS

FIG. 3 is a schematic diagram of the lubricating fluid distribution and pump system of this invention;

FIG. 4 is a perspective view of another embodiment of the lubricating system for plow blades of this invention; and FIG. 5 is a cross-sectional view taken along line V—V of FIG. 4.

DESCRIPTION OF THE PREFERRED EMBODIMENTS

Figure 1:
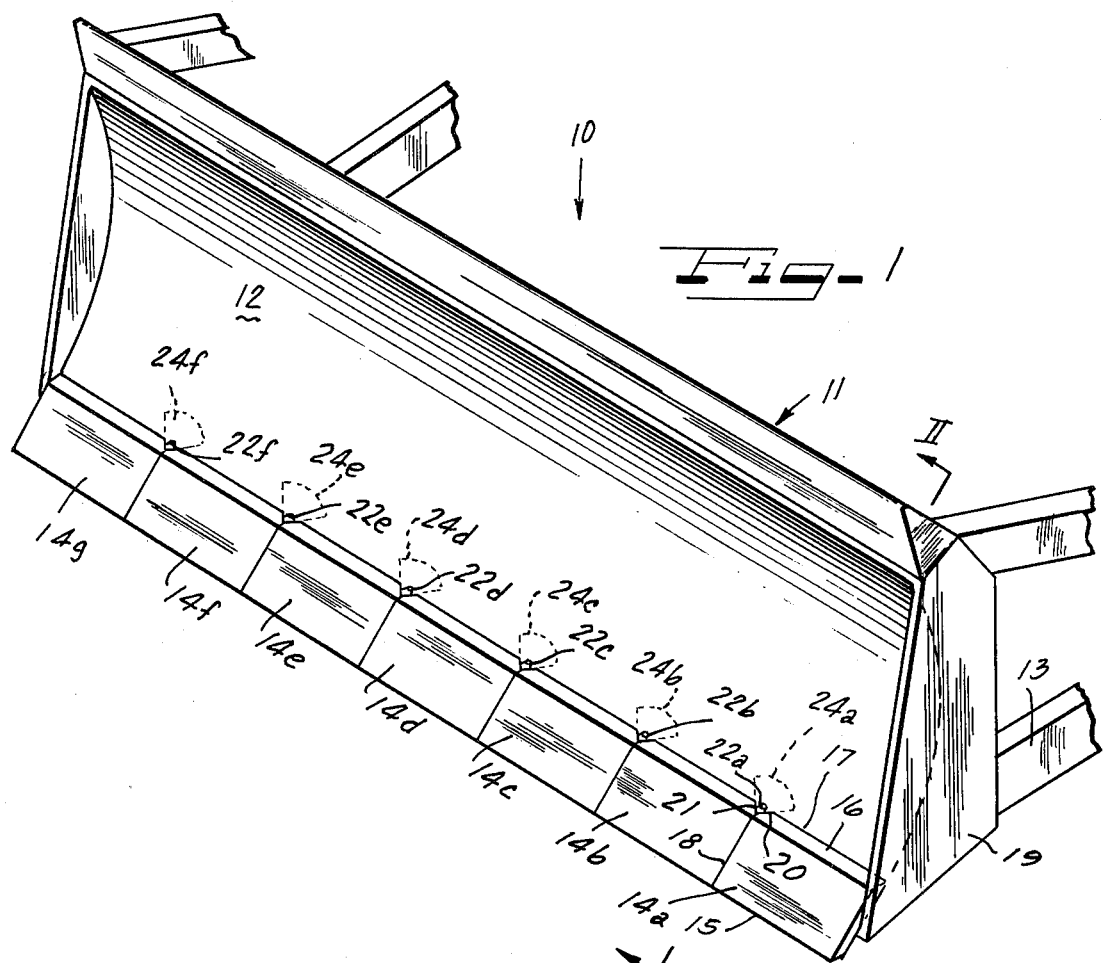
FIG. 1 is a perspective view of a plow blade lubricating system of this invention.

A lubricating system for plow blades is generally shown at 10 in FIG. 1. A tractor or bulldozer 9 has a plow blade 11 connected thereto by mounting arm or arms 13. The blade 11 has an arcuate blade face 12 and a plurality of cutting plates 14a –g mounted along the lower portion of the blade face 12. Each of these cutting blades has a lower portion functioning as a cutting edge 15 and a flat top edge portion 16 which creates an offset with respect to the blade face or surface 12. This offset creates a shadowed or protected area 17, most clearly shown in FIG. 2, adjacent the top edge 16 such that when ground scrapings flow over the cutting plate they do not exert large pressures in the shadow of the offset.

Cutting plates which abut one another (14a and 14b, for example) form joints 18. Notches or bevelled portions 20 and 21 such as in abutting cutting plates 14a and 14b form a V-shaped opening between adjacent cutting blades. Pipe or tube outlets 22a–f are aligned within each of the V-shaped portions between abutting cutting plates. These pipe outlets are aligned to be parallel with adjacent portions of the blade face. Consequently, when a tube 23 connected to the outlet 22a–f conveys lubricating fluid, portions 24a–f wetted by lubricating fluid 24 are formed adjacent and above the outlets 22a–f.

Although it is not required, nozzles may be placed at the tube outlets 22a–f for expelling the lubricating fluid 24.

Figure 2:
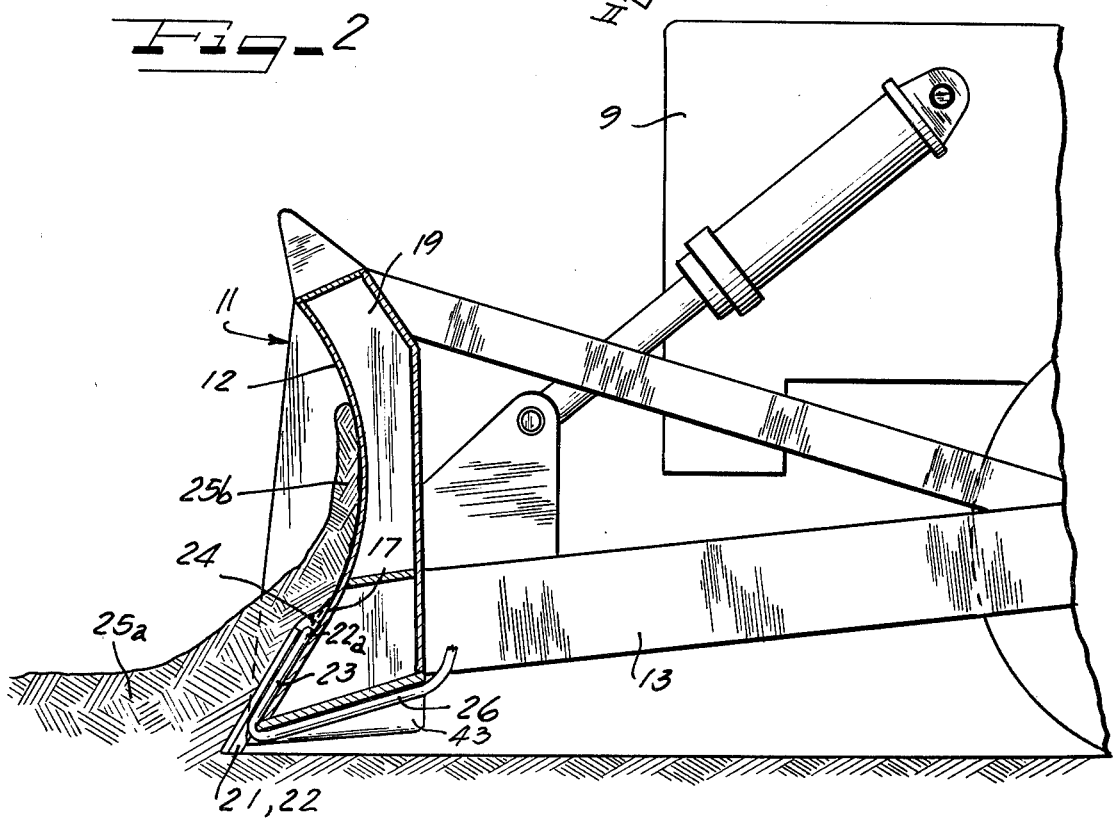
FIG. 2 is a cross-sectional view taken along line II—II of FIG. 1.

As shown most clearly in FIG. 2, as the blade 11 moves along the ground 25a, ground material 25b is scraped up which moves along the blade surface 12 and spreads the lubricating fluid 24 over the face of the blade.

Feed tubes 26a–f shown in FIG. 3 connect via tube bent portions 23 to each of the tube outlets 22a–f. These feed tubes connect with separate pumps 29a–f shown in FIG. 3. The pumps are preferably positive displacement pumps so that varying resistances at the nozzles will not affect the quantity of fluid discharged at each opening and there will be no tendency for the blade surface to foul at one location due to being starved of fluid. Feed lines 28a and 28b connect with each of the pumps 29a–f to supply fluid 24 from a storage tank 27.

Each of the feed tubes 26a–f are protected below the plow blade 11 by ridges 43 between which the feed tubes 26a–f are aligned.

The lubricating fluid 24 is preferably a dilute polymer having water as the principal diluting agent. High molecular weight acrylic polymers offer substantial lubricating properties even an high dilutions. As little as 1% or 2% of polymer in solution is needed to provide substantial lubricating qualities.

Another embodiment of this invention is shown in FIGS. 4 and 5. A blade 31 is again shown having cutting plates 32a–f mounted along a bottom portion thereof. A blade face 33 has a reinforcement portion 34 which is mounted by mounting means 35 to a tractor. Apertures 36 in the reinforcement portion 34 and aperture 39 in the blade face 33 are provided adjacent an upper edge 40 of the cutting plates 32a–f for each tube outlet 39a–f. A feed pipe 38 is inserted through these apertures. Aperture 37 in the blade face 33 permits each of the feed pipes 38 to connect with the tube outlets 39a–f. Each of the outlets 39a–f is aligned by a bent tube portion 42 to project upwardly and parallel with the blade surface 33. This outlet lies well within a protected area 41 formed by the offset between the exposed surface of the cutting plate 32 and the blade surface or face 33. In this embodiment, the tube outlets 39a–f are exposed and consequently installation of various nozzle designs is most convenient in this embodiment.

The lubricating system of this invention is found to increase plowing efficiency by an average of approximately 25% in tests with a forty foot wide blade having five lubricating fluid injection points with a fluid injection rate of one gallon per minute through each of the injection points. A 2% polymer solution was employed to obtain this average efficiency.

OPERATION

As shown most clearly in FIG. 2, as the blade scrapes along the ground 25a, ground material 25b is scraped up and slides upward and laterally across the blade. Since the lubricating fluid injection points are located near the bottom of the blade, as the scraped up dirt catches the fluid 24, it is evenly spread across the entire blade. Consequently, large fluid injection pressures are not needed.

An important element of this invention is the design step taken to prevent clogging of each of the individual injection points. Since each tube outlet is fed with a separate pump, clogging of one outlet will not increase pressures at the other outlets. Consequently, the clogged line will constantly have the pressure of its pump applied to it. Furthermore, by locating the fluid injection tube outlets in a protected area (17 in FIG. 2 and 41 in FIG. 5) clogging is minimized. As shown in FIG. 2, as earth scrapings 25b proceed over the cutting plate 14 and onto the plate surface 12, a low pressure pocket is created due to the offset levels of the cutting blade and main blade surface.

This invention is especially useful with large dimension plow blades. It should be understood, however, that the tube outlets of this invention may be designed to expel lubricating fluid onto other types of earth moving equipment.

Although various minor modifications may be suggested by those versed in the art, it should be understood that I wish to embody within the scope of the patent warranted thereon, all such embodiments as reasonably and properly come within the scope of my contribution to the art.

I claim as my invention:

1. A lubricating system for plow blades mounted on a vehicle comprising:
   a. a lubricating fluid storage container;
   b. a plow blade having a blade surface and a cutting edge at a lower edge of said surface, said cutting edge being formed by a lower edge of a cutting plate mounted to a lower portion of said blade surface, an offset being formed between said cutting plate and blade surface;
   c. a tube outlet aligned to expel said lubricating fluid upward from said offset and onto said blade surface, said tube outlet being located above said cutting edge and at said offset;
   d. a feed tube supplying the lubricating fluid to said tube outlet;
   e. a pump leading from said storage container and connected to said feed tube; and
   f. said cutting plate having a notch cut to receive a portion of the feed tube which connects to said tube outlet, said tube outlet being located under and shielded by said cutting plate.

2. The system of claim 1 in which said outlet tube is aligned approximately parallel to and resting on adjacent portions of said blade surface.

3. The system of claim 1 in which said storage container contains a lubricating fluid comprising a dilute polymer and a diluting agent comprising water.

4. The system of claim 3 in which said polymer comprises a high molecular weight acrylic polymer.

5. The system of claim 1 in which a plurality of said tube outlets are provided, each tube outlet being connected to a feed pipe; and a separate pump means is provided for each feed pipe, and pump means all being connected to said storage tank whereby plugging of one tube outlet will not increase pressure at other tube outlets since pressure at each tube outlet is substantially independent of pressure at other tube outlets.

* * * * *